United States Patent
How

(10) Patent No.: US 6,577,933 B2
(45) Date of Patent: Jun. 10, 2003

(54) ELECTRONICALLY TRACKED ROAD-MAP SYSTEM

(76) Inventor: Hoton How, 262 Clifton St., Belmont, MA (US) 02478

( * ) Notice: Subject to any disclaimer, the term of this patent is extended or adjusted under 35 U.S.C. 154(b) by 37 days.

(21) Appl. No.: 09/849,894

(22) Filed: May 7, 2001

(65) Prior Publication Data

US 2002/0169528 A1 Nov. 14, 2002

(51) Int. Cl.⁷ .................................................. G05D 1/00
(52) U.S. Cl. ........................................................ 701/23
(58) Field of Search .............................. 701/23–27, 50, 701/200–202, 205–210, 213–214, 216, 301, 220–221, 223–224; 340/425.5, 427, 431–438, 933, 979, 937–938, 988, 989; 342/104, 106, 113, 357.12–357.14, 455–458; 180/167–168, 204

(56) References Cited

U.S. PATENT DOCUMENTS

| 5,155,683 | A | * | 10/1992 | Rahim | .......................... | 180/168 |
| 5,923,270 | A | * | 7/1999 | Sampo et al. | ................. | 180/6.7 |
| 6,032,084 | A | * | 2/2000 | Anderson et al. | ........... | 700/241 |
| 6,092,010 | A | * | 7/2000 | Alofs et al. | ................. | 180/167 |
| 6,128,574 | A | * | 10/2000 | Diekhans | ..................... | 701/202 |

* cited by examiner

Primary Examiner—Thu Nguyen

(57) ABSTRACT

Disclosed is a method for establishing and utilizing electronic tracks on roads for ground vehicles so as to ease the driving task with added safety and efficiency. Electronic tracks define traces on roads guiding the movement of a ground vehicle in as much as the same way that railroad tracks confine the movement of a train. Speed control can be achieved by using equipments detecting the driving conditions and the road environment along with the gliding action of the ground vehicle on electronic tracks. Automation in driving is thus possible, at least partially. Electronic map can be constructed consisting of many of the electronic tracks. Based upon both the static and dynamic information on roads, an electronic map is able to configure an optimal route connecting two addresses with the shortest time in traveling.

12 Claims, No Drawings

ELECTRONICALLY TRACKED ROAD-MAP SYSTEM

CROSS-REFERENCE TO RELATED APPLICATIONS

Not Applicable

BACKGROUND

1. Field of Invention

This invention is directed to a method of establishing and utilizing a computer-tracked road-map system for aiding the driving of a ground vehicle. In other words, invisible tracks are set up for roads and stored in computer memories or disks so that the consequent driving of a ground vehicle can be assisted and even automated by computers.

2. Description of Prior Art

Driving a ground vehicle (a passenger car, a bus, or a truck) can be painful and dangerous, especially when driving over long distance with heavy traffic. Although a collision avoidance radar can help detecting the protrusion of an unexpected object (a pedestrian, an interrupting vehicle, or a falling rock on the road) driving a ground vehicle always requires full attention of the driver. Although a global positioning system (GPS) antenna can locate the receiver position with an accuracy of ~100 m, the spatial resolution is not sufficient for guiding a ground vehicle sailing on the road, even not to mention the possibility that GPS signals are apt to be blocked by mountains and buildings, especially when passing through a tunnel. During your way home from work, or vise versa, even if you have driven the same road one hundred times, you still have to pay equal attention for your $101^{st}$ drive. At present, unmanned vehicle on the road is almost impossible. Thousands of truck drivers are employed delivering cargos routinely and repetitively from one port to another. Car accidence occurs everyday and every moment. The way of driving a ground vehicle is essentially the same as it was 50 years ago, even if we have entered the computer age with versatile communication skills. Safe, reliable, and efficient driving systems are in big demand by our society.

Accordingly, it is an objection of the invention to address one or more of the foregoing disadvantages or drawbacks of the prior art, and to provide such an improved method to obtain computer-aided driving systems for ground vehicles for assistance in road riding. By combining the other existing tools in navigation, for example, anti-collision radars, remote cameras, light detectors, and GPS antennas, this invention makes it possible for automated driving, at least partially, in addition to other advantages in route finding, position reporting, risk analyzing and alerting, etc.

Other objects will be apparent to one of ordinary skill, in light of the following disclosure, including the claims.

SUMMARY

The invention provides a method which sets up tracks on roads confining and guiding the movement of a ground vehicle. The tracks are virtually recorded in a computer storage medium forming an electronic map with high spatial resolution. Once launched in the track-map system, a ground vehicle can then, if requested, travel by itself, configuring the correct route, watching out for an accidence, and analyzing traffic and road conditions, thereby adding safety and efficiency to the driving of the ground vehicle.

DETAILED DESCRIPTION

A train can move only on the track of a railroad, or the movement of a train is confined and guided by the track of a railroad. To drive a train one needs, in principle, only to control the speed of the train, but not its direction, making stops and then re-starts at various train stations. If tracks can be set up on roads, not physically but analogously in computer memories or disks, a ground vehicle can then travel by itself, provided that its speed can be controlled by some other means. In the following an electronic track is first described, followed by subsequent use of the track by a ground vehicle.

On driving a ground vehicle two things are continuously practiced and noticed: the instantaneous speed (velocity) and direction (orientation). Assuming there is no other vehicles on the road, no traffic lights, and no unexpected interrupts and protrusions, once the speed and direction are known as a function of time, the vehicle's motion is completely determined. After integrated with time, the speed data become distances, and hence if the direction of the vehicle is known as a function of the traveled distance, the trace of the vehicle is completely determined. The advantage of using this direction-versus-distance expression is that it is independent of the speed of the vehicle: The vehicle can go slower or faster, but its trace will all remain the same. This converts the track of a road, or a traveling route, into two columns of numbers: speed and direction. A track is thus a series of points located on the road with fine spatial resolution. An electronic track, once established, can be used by a ground vehicle of any kind, including a passenger car, a van, a bus, a truck, or even a motorcycle.

Thus, an electronic track includes two sets of digital data which is saved in the memories or disks of a computer. A subsequent call to this track information means to force a ground vehicle to follow a pre-defined trace on the road. As such, on driving the vehicle the only thing that the driver needs to do is to press the brake or the acceleration pedals, eliminating altogether the need for turning around the steering wheel. This eases the task of driving, and hence the driving of a ground vehicle along an electronic track becomes essentially the same as the driving of a train on a railroad track. Via the use of other equipments, even the job for speed control can be left out for the computer, as discussed as follows.

The electronic tracks are marked at positions where traffic lights appear. If light detectors are installed with the vehicle capable of detecting the colors of traffic lights, the computer looks out for traffic lights in priori so as to decide whether to go beyond them or to stop before them. Collision avoidance radar is installed with the vehicle so that unexpected protrusion of objects, including unsafe approach by other vehicles, can be detected and handled promptly and properly. Stop signs and road construction signs, for example, can be visualized via an image recognition radar, or by other means including listening to some special signals emitted from devices installed with these signs, which can be ultrasonic, electromagnetic, or optical in nature. Speed regulation signs may also be checked in a similar manner.

Multiple tracks are included for a road consisting of many lanes and/or a shoulder. This allows for the ground vehicle to change lanes if the computer decides to do so. Responses to other emergent situations, for example, engine breakdown, detouring, and yielding to an ambulance car, etc, can also be programed beforehand for the computer. The driver is now allowed to sit back and relax and it is the computer and the peripheral sensors/radars that are physically performing the tedious task driving the vehicle. In an unmanned vehicle remote cameras are installed so that the sailing or gliding of the vehicle along tracks can be monitored and controlled at a distance. For example, in the command room an operator can simultaneously drive, say, 10 trucks traveling though routes around the country. This results in safety, economy, and efficiency. Unmanned vehicles are thought to be most effective in shuttling among ports connected by highways where only a limited number of traffic lights appear.

Many electronic tracks can emerge to form a road map. This electronically tracked road-map system can show intelligence, providing both the static and the dynamic information on the road. For example, by entering two addresses the computer can calculate a route with the shortest time for traveling considering the real traffic on the road. This is achieved by connecting the computer with a web site (or sites) updating the traffic information on the road in a real-time fashion. Thus, it is possible to locate, to trace down, and to plan a reception party at the arrival of a traveler.

The track information on roads can be established by a driver individual, a private company, or by a public community. For example, you may prefer a route traversing a particular scenery each day you transport from home to work. To do this, you need to record your driving action the first time you drive along that route, expressing the orientation of the steering wheel as a function of the distance traveled, as discussed previously. Next time when you are on the road again, what you need to do is to play back the recorded track information, allowing you to be placed on electronic tracks outlining an identical trace, analogous to the play-back of a cassette tape. Upon riding on these electronic tracks you may still want to control the speed of your vehicle, or you may leave it altogether to the computer, as if you have hired the computer as the driver of the vehicle.

An electronic track consists of two long series of numbers in distance and in direction, both at high accuracy. The regular readings in odometer and in steering-wheel positions installed with a normal ground vehicle may not be accurate enough to define an electronic track. Sensitive odometer readings, down to the order of, say, 1 foot, and sensitive steering-wheel orientation readings, down to the order of, say, 1 degree, may need to be fabricated and employed. Alternatively, one may install auxiliary equipments to help measuring distance and direction at high accuracy. For example, a laser beam can be used to measure distance, and an electronic compass, or an optical gyroscope, can be used to measure direction. These components will provide sufficient accuracy and hence fulfill the requirement for electronic-track applications. The track information on roads are stored in computer disks prepared and sold by a private company, for example.

At times the computer needs to verify the track information comparing to the actually measured data in driving distance and direction. This can be done by setting up calibration points along the tracks of a road. For example, the calibration points can be allocated coincident with the positions of traffic lights, or the milestone marks in a highway, so that each time a set of traffic lights, or a milestone mark, is passed, a calibration process is called, thereby modifying the current readings in odometer and in steering-wheel position, if necessary. This calibration process can effectively inhibit the growth of track errors. A GPS antenna may be installed with a ground vehicle so that the vehicle can automatically launch into tracks stored in the computer. Otherwise, the initial position of the vehicle needs to be entered manually, for example, by keying in a street number using the keyboard. An initial try-and-error process may be called before the vehicle is placed right on in an electronic track.

Today computers are very fast and the memory storage is huge and inexpensive. For a personal computer the CPU speed can be faster than 1 GHz and a hard drive of 100 G bytes is not uncommon. This makes an electronically tracked road-map system plausible. For example, assuming a spatial resolution of I foot and an angular resolution of 1 degree, an electronic track on a 100 mile road contains ~10,000 binary numbers, occupying a memory space of roughly 40 K bytes. Extra space is needed for other data, such as positions of traffic lights, intersection with other road tracks, information on lanes and shoulders, etc. By all means, an electronically tracked road-map system can be conceivably installed and executed in a computer with moderate speed and memory space.

The scope of the invention should be determined by the appended claims and their legal equivalent, rather than by the examples given. It is also understood that the following claims are to cover all generic and specific features of the invention described herein, and all statements of the scope of the invention which, as a matter of language, might be said to fall therebetween.

I claim:

1. A method for achieving computer aided driving comprising;
   A. allocating an initial point of an electronic track;
   B. selecting a route containing one or more electronic tracks connecting said initial point allocated on said electronic track to a destination;
   C. retrieving data of said one or more electronic tracks making use of travel distances and the corresponding directions of a ground vehicle;
   D. controlling a ground vehicle to follow said one or more electronic tracks so that for each retrieved travel distance, steering said ground vehicle such that the actual direction of said ground vehicle matches the respective retrieved direction, thereby adding comfort, economy, and safety to the driving of said ground vehicle.

2. The method of claim 1 wherein said initial point represents the starting point on launching into said electronic track, which can be either entered manually or fit electronically by a computer.

3. The method of claim 1 wherein said destination can be located within one electronic track coincident to said electronic track, or referenced in relation to a plurality of electronic tracks containing said electronic track.

4. The method of claim 1 wherein said data of said one or more electronic tracks are obtained either by playing back the recorded data in computer memories, disks, or tapes, or by receiving from another source at a remote site in real time, or by selecting from a collection of electronic tracks prepared and sold by a commercial company capable of providing instantaneous directions as a function of distances.

5. The method of claim 4 wherein said one or more electronic tracks prepared and sold by said commercial company are pre-recorded in a storage medium, including computer memories, tapes, or disks, or to be fetched in real time through wireless communication.

6. The method of claim 1 further including the step of using local markers as calibration points to facilitate electronic fitting of said initial point of said electronic track when called for on one hand, and to monitor the difference between the retrieved data of electronic tracks and the physical tracks traced out by said ground vehicle on road on the other hand, thereby making subsequent modification of said retrieved data of said electronic tracks.

7. The method of claim 6 wherein said local markers include traffic-lights poles, or milestone stakes marks installed at the actual road sides or on the actual road surfaces corresponding to said electronic tracks.

8. The method of claim 1 wherein distances and directions are measured along with the driving of said ground vehicle to facilitate implementation of said electronic tracks, and, upon request, the steering wheel of said ground vehicle is adjusted electronically to enforce said ground vehicle to follow the instantaneous directions provided by said one or more electronic tracks as said ground vehicle travels down said one or more electronic tracks.

9. The method of claim 8 wherein said distances and directions are measured by making reference to the odometer and the steering-wheel readings of said ground vehicle, or from devices capable of providing precision measurements in distance and in direction, including the use of a laser beam, an electronic compass, and a gyroscope.

10. The method of claim 1 wherein said one or more electronic tracks are annotated with supplemental data providing further information about road conditions, regulations, street names and numbers, number of lanes, shoulders, road widths, and other dynamic data which may be fetched in real time through wireless communication, including weather, traffic, and other emergent regulation conditions.

11. The method of claim 1 wherein other equipments including light sensors, GPS locators, video camera, collision avoidance radars, speed controller, or gyroscopes are used in conjunction with said electronic tracks to provide further services and assistance to said ground vehicle.

12. The method of claim 1 wherein said one or more electronic tracks are selected from a collection of electronic tracks forming an electronic map, which, upon request, is able to configure an optimal route connecting an initial point to a destination taking into account road conditions and traffic conditions.

* * * * *